Aug. 1, 1967  B. O. KAPPELMANN ETAL  3,333,557
MULCH SHEET PERFORATING APPARATUS
Filed April 15, 1965

INVENTOR.
BENJAMIN O. KAPPELMANN
-AND- DAVID L. DUNCAN.

ATTORNEY.

United States Patent Office 3,333,557
Patented Aug. 1, 1967

3,333,557
MULCH SHEET PERFORATING APPARATUS
Benjamin O. Kappelmann, Tempe, and David L. Duncan, Scottsdale, Ariz., assignors to Precision Agricultural Machinery Company, Phoenix, Ariz., a corporation of Arizona
Filed Apr. 15, 1965, Ser. No. 448,339
3 Claims. (Cl. 111—91)

ABSTRACT OF THE DISCLOSURE

An agricultural machine for thermally perforating longitudinally spaced plant growth holes in a plastic mulch sheet previously laid along the plant row.

This invention pertains to agricultural machinery and is particularly directed to a machine for perforating holes in plastic mulch sheets stretched on a plant row in a field.

This application is related to Patent 3,175,524, issued Mar. 30, 1965, and Patent 3,154,032 issued Oct. 27, 1964.

One of the objects of this invention is to provide a mulch sheet perforating machine for forming a series of holes in predetermined accurate longitudinal spaced positions in a mulch sheet covering a plant row.

Another object of this invention is to provide a mulch sheet perforating machine adapted to be operated in conjunction with a precision seed planter to form plant growth holes in a mulch sheet in exact register with the seeds previously planted by the precision seeder.

It is also an object to provide an apparatus operating in conjunction with a precision seed planter adapted to apply subsequent operations to a plant row such as perforations in a mulch sheet and tamping the soil on and around the planted seed in exact register with the planted seeds.

A further object is to provide a device for forming adequate and clean cut plant growth holes in a previously seeded and mulch covered plant row.

And it is a further object to construct a mulch sheet perforating machine adapted to form holes in a mulch sheet covering a plant row that has been previously seeded in longitudinally spaced positions in such a manner that the perforations are in exact register with and present clean holes for the seeds planted in the plant row.

Further features and advantages of this invention will appear from a detailed description of the drawings in which.

Figure 1:
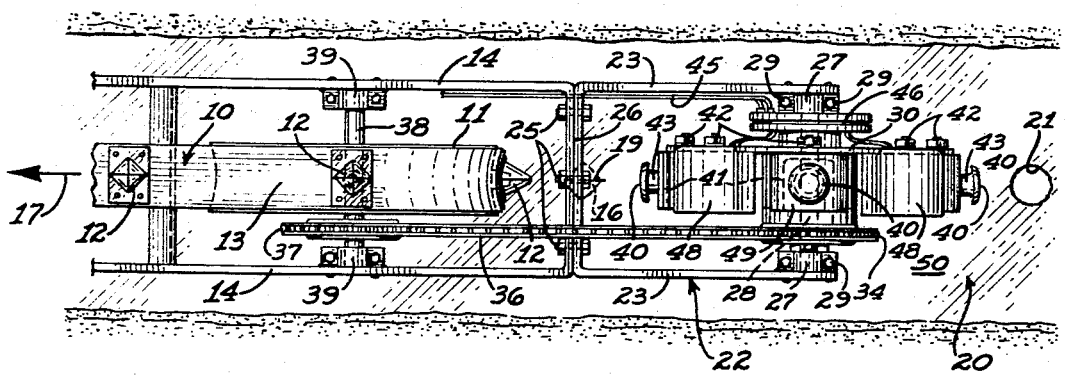
FIG. 1 is a plan view of a mulch sheet perforating machine for a precision seed planter incorporating the features of this invention.
Figure 2:
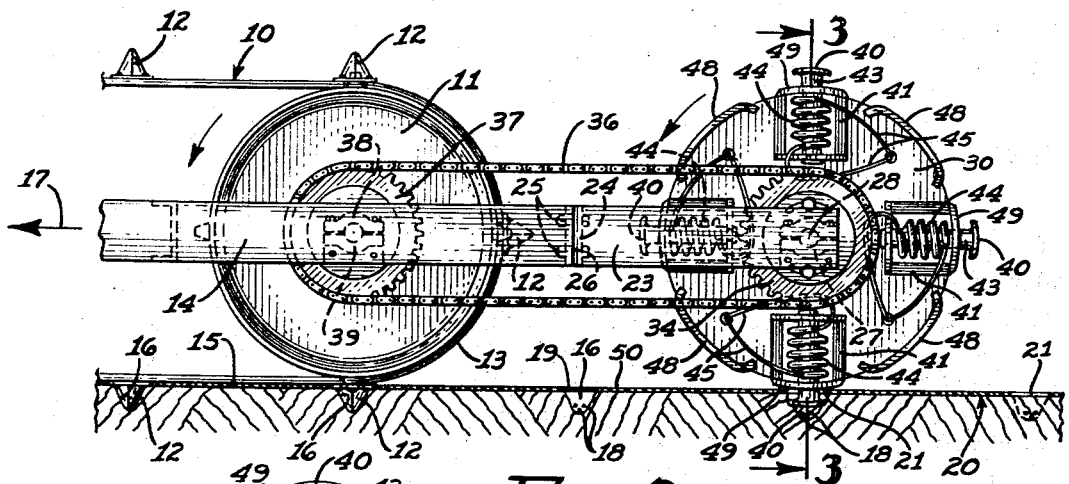
FIG. 2 is a left hand side elevation of the apparatus shown in FIG. 1.
Figure 3:
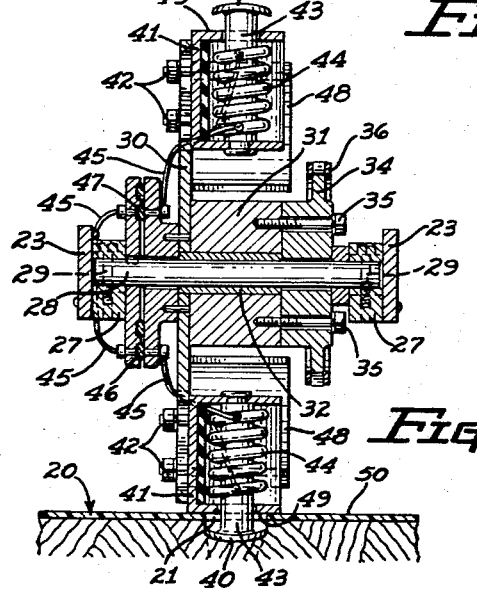
FIG. 3 is an enlarged diametral sectional view on the line 3—3 of FIG. 2.

As an example of one embodiment of this invention, there is shown a mulch sheet perforating machine particularly adapted for use with a precision seed planter and the like such as shown in the above recited patents in which the essential elements comprise an endless flat belt 10 operating over a concave pulley 11 and having a series of hollow planting fingers 12 extending outwardly from the outer face 13 of the belt 10. The pulley 11 is suitably journaled on a frame 14 which is suitably connected to the usual towing and lifting arms of a tractor, not shown. As the precision planter referred to is towed along the plant row ground surface 15 in the direction 17 the planting fingers 12 form longitudinally spaced planting cavities 16 in which the planting fingers 12, and associated apparatus, deposits the seed, fertilizer and mulch. Preferably, the precision seed planter operates over a previously laid mulch sheet 20, such as laid down by apparatus disclosed in application Ser. No. 216,637, filed Aug. 13, 1962, now Patent Number 3,180,290, and also in Patent Number 3,293,797, so that the seeds 18 are planted below the mulch sheet through slits 19 formed in the mulch sheet 20 by the planting fingers 12. Unfortunately, the slits 19 formed by the planting fingers 12 tend to remain closed so as to unfavorably affect germination of the seeds 18 and then subsequent initial growth up through the plastic mulch sheet 20.

It is therefore the purpose of the present invention to provide a relatively large clear and clean hole 21 through the mulch sheet for adequate plant growth located directly, accurately and in proper register with the seeds 18 planted in the planting cavities 16 by the precision seed planter.

To this end there is provided a mulch sheet perforating machine operating in synchronism with the aforementioned precision seed planter comprising a frame indicated generally at 22 comprising the side arms 23 which have at their front ends a turned over transverse portion 24 secured by suitable bolts 25 to the rear end 26 of the planter frame 14. To the rear ends of the side arms 23 the frame 22 is fixed the support blocks 27 to which is fixed the transverse shaft 28 by suitable bolts 29. A disc 30 is fixed to a hub 31 which is journaled by a suitable bearing bushing 32 on the shaft 28 and confined axially thereon by the blocks 27 and spacing collar 33. A sprocket 34 is fixed to the hub 31 by suitable bolts 35. A chain 36 operates over the sprocket 34 and a sprocket 37 fixed on the shaft 38 journaled in suitable bearings 39 carried on the plant frame 14, the convex pulley 11 being fixed to said shaft 38. By this arrangement the disc 30 and convex pulley rotate in synchronism as the planter is moved in the direction 17 along the plant row.

Carried on the outer periphery of the disc 30 are a series of pressure feet 40 corresponding in number to the numbers and spacing with the planting fingers 12 on the concave pulley belt 10. Each foot is supported in suitable boxes 41 fixed to the disc 30 by suitable bolts 42. Each foot 40 has a shank 43 which is surrounded by a heating or induction coil 44 energized through suitable electric power supply leads 45 connected through concentric slip rings 46 and 47 between the disc 30 and frame side arms 23 in any convenient manner. Peripheral pressure plates 48 formed on the disc 30 and peripheral pressure surfaces 49 on the pressure feet boxes engage and roll along on the top surface 50 of the mulch sheet 20 while the heated pressure feet 40 extend radially outwardly beyond the peripheral surface defined by the surfaces of 48 and 49 so that as the foot arrives over a slit 19 in the mulch sheet through which the seed 18 has been planted, the heated foot 40 melts, disintegrates, and vaporizes the mulch sheet 20 to form a clean circular hole 21 therein through which the germinating seed can readily sprout and grow into a full plant without any interference from the mulch sheet 20. Further, since the foot 40 projects through and below the mulch sheet it also tamps and compacts the soil firmly about the plant seeds for better germination and growth.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

What is claimed is:
1. A mulch sheet perforating apparatus for a seed planter having:
(A) an endless planter belt operating over a pulley,

(B) planting fingers projecting outwardly from outer face of said belt for forming planting cavities through a previously laid mulch sheet on the ground surface of a plant row, (C) a planter frame journaled on and supporting said pulley and belt in operative position, (D) a mulch sheet perforating apparatus for forming plant growth holes in said mulch sheet over said planting cavities comprising in combination a perforating apparatus frame mounted on said planter frame, (E) a rotary ground engaging member journaled on said frame, (F) a series of circumferentially disposed heated pressure feet mounted to project radially outwardly of the periphery of said rotary member, (G) means to heat said pressure feet, (H) and a timing drive transmission between said pulleys of said endless planter belt and said rotary member to rotate said rotary member in timed relationship with the movement of said belt so as to maintain said perforations formed by said pressure feet in said mulch sheet in register with the planting cavities formed by said planting fingers of said belt in said mulch sheet.

2. A mulch sheet perforating apparatus for a seed planter having:

(A) an endless planter belt operating over a pulley, (B) planting fingers projecting outwardly from outer face of said belt for forming planting cavities through a previously laid mulch sheet on the ground surface of a plant row, (C) a planter frame journaled on and supporting said pulley and belt in operative position, (D) a mulch sheet perforating apparatus for forming plant growth holes in said mulch sheet over said planting cavities comprising in combination a perforating apparatus frame mounted on said planter frame, (E) a rotary ground engaging member journaled on said frame, (F) a series of circumferentially disposed pressure feet mounted on the periphery of said rotary member, (G) a timing drive transmission between said pulleys of said endless planter belt and said rotary member to rotate said rotary member in timed relationship with the movement of said belt so as to maintain said perforations formed by said pressure feet in said mulch sheet in register with the planting cavities formed by said planting fingers of said belt in said mulch sheet, (H) and means for heating said pressure feet to a temperature to melt, vaporize and incinerate the perforated portions of said mulch sheet, 3. A mulch sheet perforating apparatus for a seed planter having:

(A) an endless planter belt operating over a pulley, (B) planting fingers projecting outwardly from outer face of said belt for forming planting cavities through a previously laid mulch sheet on the ground surface of a plant row, (C) a planter frame journaled on and supporting said pulley and belt in operative position, (D) a mulch sheet perforating apparatus for forming plant growth holes in said mulch over said planting cavities comprising in combination a perforating apparatus frame mounted on said planter frame, (E) a rotary ground engaging member journaled on said frame, (F) a series of circumferentially disposed pressure feet mounted on the periphery of said rotary member, (G) a timing drive transmission between said pulleys of said endless planter belt and said rotary member to rotate said rotary member in timed relationship with the movement of said belt so as to maintain said perforations formed by said pressure feet in said mulch sheet in register with the planting cavities formed by said planting fingers of said belt in said mulch sheet, (H) means for heating said pressure feet to a temperature to melt, vaporize and incinerate the perforated portions of said mulch sheet, (I) and peripheral pressure plates adapted to contact the top surface of said mulch sheet located radially inwardly of the outer ends of said pressure feet so that said feet tamp and compact the soil around said plant seeds after forming said plant growth holes in said mulch sheet.

References Cited

UNITED STATES PATENTS

| | | | |
|---|---|---|---|
| 3,121,973 | 2/1964 | Phillips et al. | 47—9 |
| 3,154,031 | 10/1964 | Kappelmann | 111—7 |
| 3,175,524 | 3/1965 | Kappelmann | 111—91 |

ABRAHAM G. STONE, *Primary Examiner.*

A. E. KOPECKI, *Assistant Examiner.*